(12) United States Patent
Kawamoto et al.

(10) Patent No.: US 9,124,103 B2
(45) Date of Patent: Sep. 1, 2015

(54) ELECTRICAL STORAGE APPARATUS

(75) Inventors: Shinya Kawamoto, Yokohama (JP); Tamotsu Endo, Tokyo (JP)

(73) Assignee: Kabushiki Kaisha Toshiba (JP)

( * ) Notice: Subject to any disclaimer, the term of this patent is extended or adjusted under 35 U.S.C. 154(b) by 512 days.

(21) Appl. No.: 13/526,833

(22) Filed: Jun. 19, 2012

(65) Prior Publication Data

US 2012/0326531 A1    Dec. 27, 2012

(30) Foreign Application Priority Data

Jun. 22, 2011    (JP) .................. 2011-138946

(51) Int. Cl.
*H02J 7/00*      (2006.01)
*H02H 3/08*     (2006.01)
*H02H 3/28*     (2006.01)

(52) U.S. Cl.
CPC .............. *H02J 7/0031* (2013.01); *H02H 3/085* (2013.01); *H02H 3/28* (2013.01); *Y10T 307/858* (2015.04)

(58) Field of Classification Search
USPC ........................................ 307/127
See application file for complete search history.

(56) References Cited

U.S. PATENT DOCUMENTS

| | | | |
|---|---|---|---|
| 5,760,570 A * | 6/1998 | Nagai et al. ............... | 320/162 |
| 7,484,008 B1 | 1/2009 | Gelvin et al. | |
| 7,514,164 B2 | 4/2009 | Walter | |
| 2004/0047098 A1 | 3/2004 | Friedrichs et al. | |
| 2004/0057450 A1 | 3/2004 | Okuyama | |
| 2007/0080662 A1 | 4/2007 | Wu | |
| 2008/0143421 A1 | 6/2008 | Yanagihara et al. | |
| 2009/0310270 A1 | 12/2009 | Burns et al. | |
| 2010/0224885 A1 | 9/2010 | Onose | |
| 2011/0127954 A1 | 6/2011 | Walley et al. | |
| 2011/0153149 A1 | 6/2011 | Jeon et al. | |
| 2011/0291616 A1 | 12/2011 | Kim et al. | |
| 2012/0038322 A1 | 2/2012 | Moorhead et al. | |
| 2012/0326531 A1 | 12/2012 | Kawamoto et al. | |

FOREIGN PATENT DOCUMENTS

| | | |
|---|---|---|
| CN | 2510716 Y | 9/2002 |
| CN | 1411205 A | 4/2003 |
| CN | 101056004 A | 10/2007 |
| CN | 101262141 A | 9/2008 |
| CN | 101335367 A | 12/2008 |

(Continued)

OTHER PUBLICATIONS

Chinese Office Action for Application No. 2012-10146864.5 dated Mar. 5, 2014 with English translation (20 pages).

(Continued)

*Primary Examiner* — Robert Deberadinis
(74) *Attorney, Agent, or Firm* — Harness, Dickey & Pierce, P.L.C.

(57) ABSTRACT

According to one embodiment, an electrical storage apparatus includes an electrical storage unit configured to output direct-current power, a switch element configured to block positive-side wiring connecting the electrical storage unit to an outside, a diode connected in parallel with the switch element in a direction of a current flowing from the outside to the electrical storage unit, a voltage detection unit configured to detect voltages at both ends of the switch element, and a switch control unit configured to open the switch element when the voltage detected by the voltage detection unit is a predetermined value or greater.

8 Claims, 5 Drawing Sheets

(56) References Cited

FOREIGN PATENT DOCUMENTS

| | | |
|---|---|---|
| CN | 102040010 A | 5/2011 |
| FR | 2865069 A1 | 7/2005 |
| JP | 08-065895 | 3/1996 |
| JP | 2002-163038 A | 6/2002 |
| JP | 2002-325364 A | 11/2002 |
| JP | 2003-110568 A | 4/2003 |
| JP | 2008-220074 A | 9/2008 |
| JP | 2009-213345 A | 9/2009 |
| JP | 2012-085494 | 4/2012 |

OTHER PUBLICATIONS

Chinese Office Action for Application No. 2012-10168989.8 dated Mar. 21, 2014 with English translation (18 pages).
Extended European Search Report for Application No. EP 12 17 3096 dated Nov. 6, 2014 (7 pages).
Japanese Office Action for Application No. 2011-138946 dated Jan. 13, 2015 with English translation (6 pages).
Extended European Search Report for Application No. EP 12 17 7412 dated Dec. 2, 2014 (9 pages).

* cited by examiner

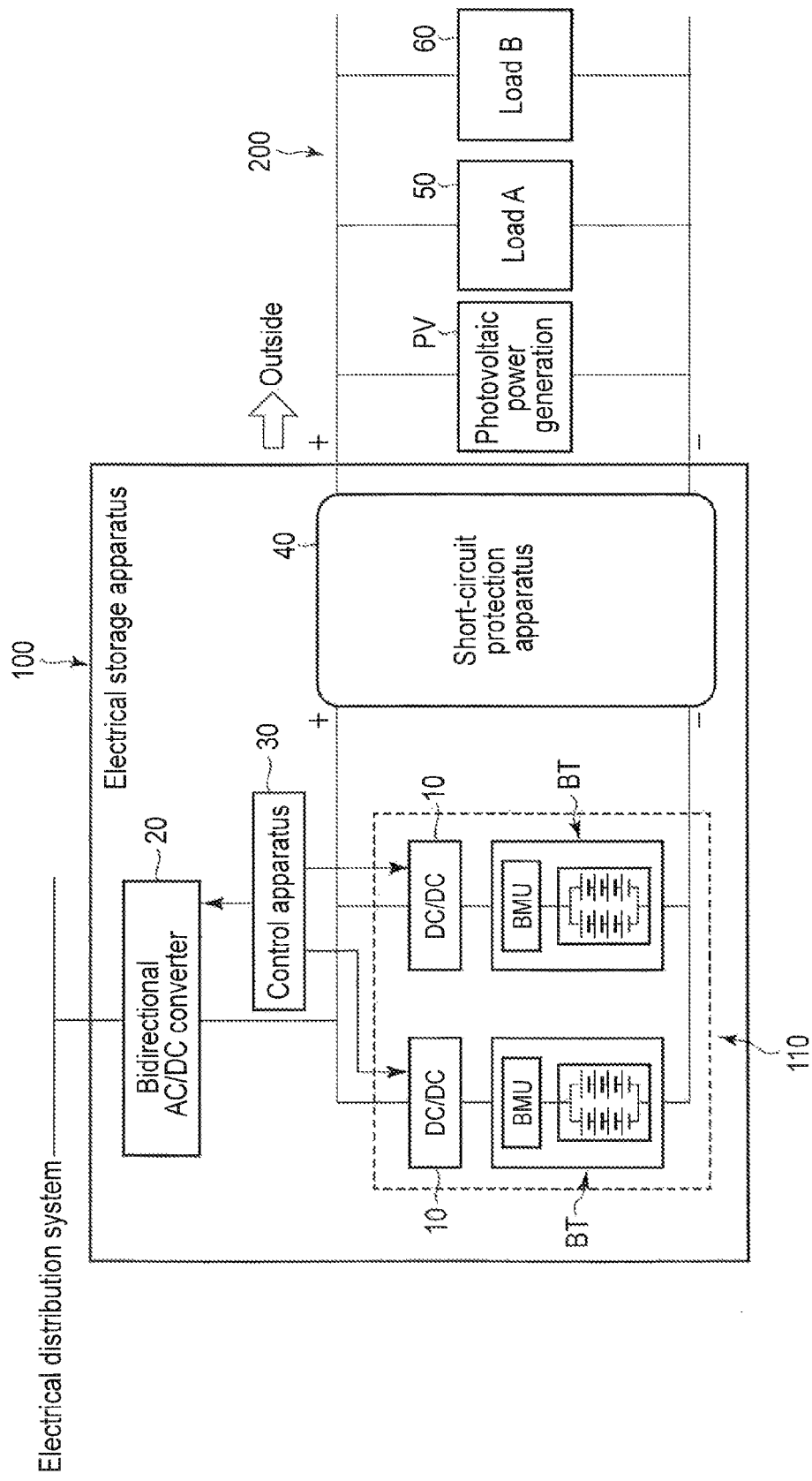
F I G. 1

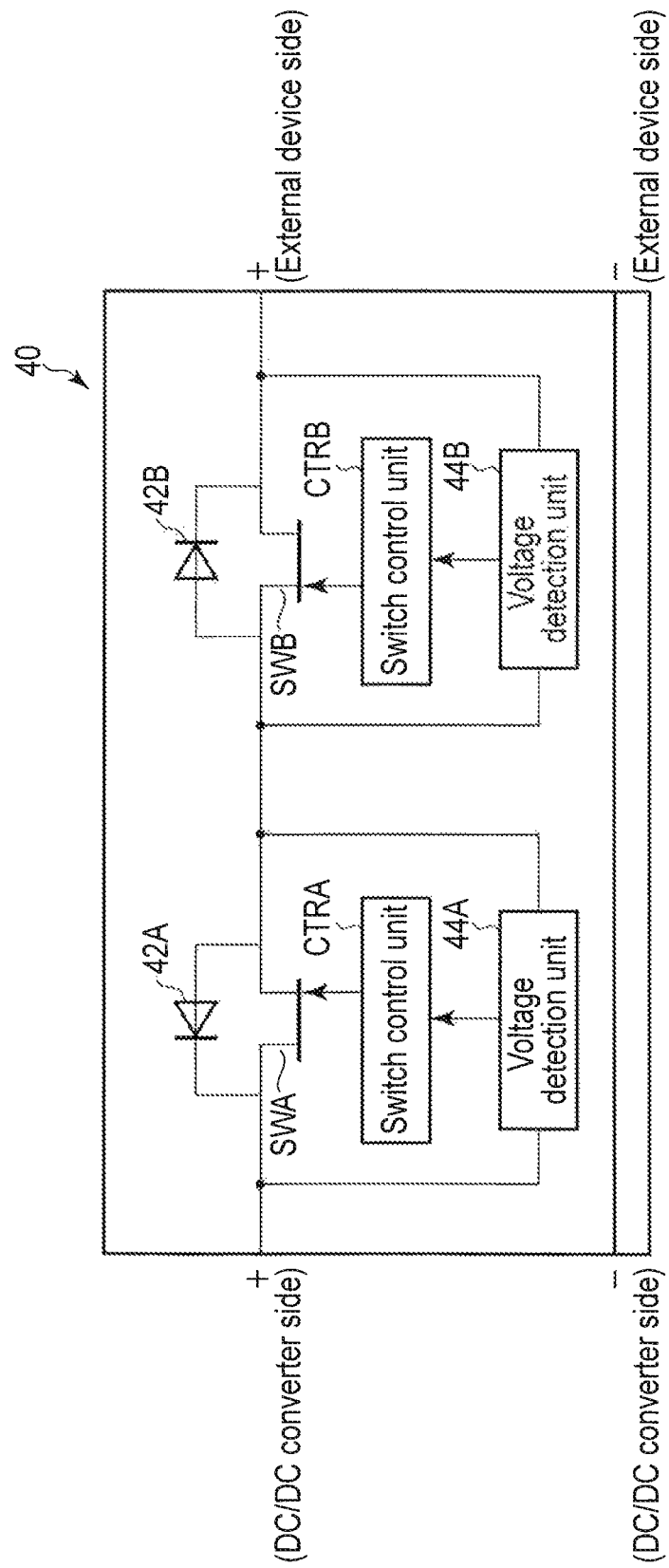
F I G. 4

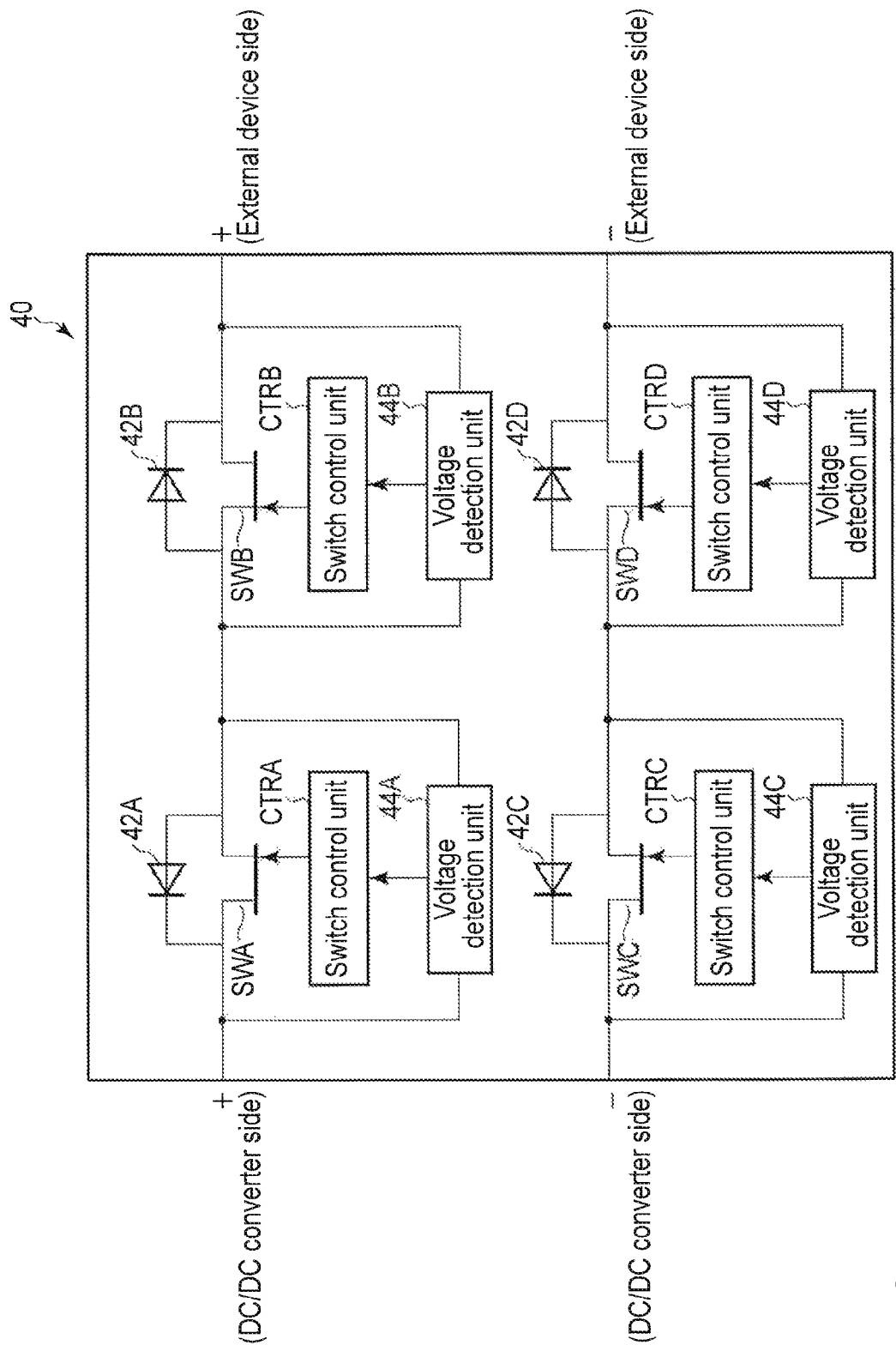
F I G. 5

ELECTRICAL STORAGE APPARATUS

CROSS-REFERENCE TO RELATED APPLICATIONS

This application is based upon and claims the benefit of priority from prior Japanese Patent Application No. 2011-138946, filed Jun. 22, 2011, the entire contents of which are incorporated herein by reference.

FIELD

Embodiments described herein relate generally to an electrical storage apparatus.

BACKGROUND

In recent years, consideration has been given to designing a power supply system with reduced carbon emissions, through installation of a power plant which utilizes renewable energy not accompanied by emission of greenhouse effect gases during power generation. Nevertheless, the power generation utilizing renewable energy finds difficulty in control of a power supply amount, and renders it difficult to realize stable supply of power.

In the future, if the number of such installation of power plants utilizing the renewable energy increases, a short-term demand-and-supply balance in power can be disturbed and power frequencies can deviate from the proper value. Such situations would obstruct the stable supply of power, thus can result in deterioration in power quality.

Accordingly, consideration has also been given to implementing electrical storage or electrical distribution, through installation of secondary batteries, which store surplus power from the power plant utilizing the renewable energy, on the sides of power systems and customers (e.g. buildings, factories). In this context, if electrical storage apparatuses and external devices are connected by direct current wiring, losses due to conversion to the alternating current will be avoided, and consequently, efficiency in use of the generated power will be improved.

BRIEF DESCRIPTION OF THE DRAWINGS

FIG. 1 generally illustrates one example of the structure of an electrical storage apparatus according to one embodiment.

FIG. 4 generally illustrates one example of the structure of a short-circuit protection apparatus in an electrical storage apparatus according to the second embodiment.

FIG. 5 generally illustrates one example of the structure of a short-circuit protection apparatus in an electrical storage apparatus according to the third embodiment.

DETAILED DESCRIPTION

Figure 2:
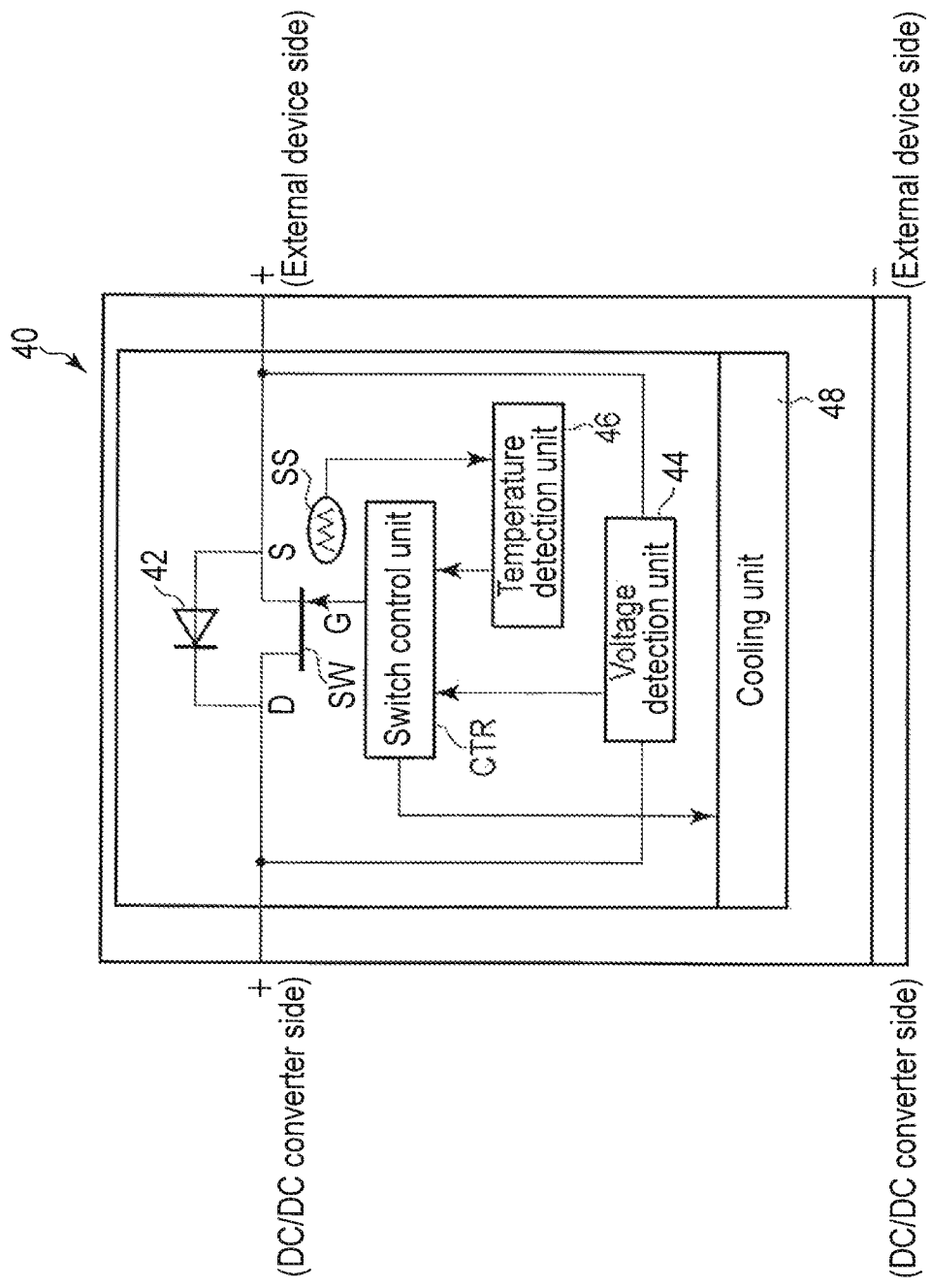
FIG. 2 generally illustrates one example of the structure of a short-circuit protection apparatus in an electrical storage apparatus according to the first embodiment.

In general, according to one embodiment, an electrical storage apparatus comprises an electrical storage unit which outputs direct-current power, a switch element which blocks positive-side wiring connecting the electrical storage unit to the outside, a diode which is connected in parallel with the switch element in the direction of a current flowing from the outside to the electrical storage unit, a voltage detection unit which detects voltages at both ends of the switch element, and a switch control unit which opens the switch element when the voltage detected by the voltage detection unit is a predetermined value or greater.

Electrical storage apparatuses according to the embodiments will be described with reference to the drawings.

FIG. 1 generally illustrates one example of the structure of an electrical storage apparatus 100 according to one embodiment. The electrical storage apparatus 100 according to the embodiment is an electrical storage apparatus intended for connection with an alternating-current electrical distribution system which is a power system inside a building, and supplies stored power to an external device 200 while being connected to the electrical distribution system.

The electrical storage apparatus 100 comprises a battery module BT, a DC/DC converter 10, a bidirectional AC/DC converter 20, a control apparatus and a short-circuit protection apparatus 40.

The battery module BT comprises a combination battery which includes a plurality of secondary battery cells, and a battery management unit (BMU) which manages battery information such as a state of charge (SOC) in the combination battery. The combination battery is formed through the series connection or parallel connection of the secondary battery cells, which are of lithium ion, NiMH, lead or the like.

The DC/DC converter 10 includes a switch element (not shown) capable for PWM (Pulse Width Modulation) control, and performs voltage conversion of the direct-current power from the bidirectional AC/DC converter 20 to charge the combination battery in the battery module PT or performs voltage conversion of the power stored in the combination battery to discharge electricity to the bidirectional AC/DC converter 20.

The bidirectional AC/DC converter 20 comprises a bidirectional inverter including a switch element (not shown) capable for PWM control, and converts the alternating-current power from the electrical distribution system to direct-current power to output it to the DC/DC converter 10, or converts the direct-current power from the DC/DC converter 10 to alternating-current power to output it to the electrical distribution system.

The control apparatus 30 communicates with the DC/DC converter 10 and the bidirectional AC/DC converter 20 and acquires the states of the alternating-current electrical distribution system, direct-current wiring and secondary battery cells to perform control of the whole electrical storage apparatus 100, such as charge and discharge control of the combination battery, and connection of systems.

The external device 200 includes, for example, a photovoltaic power generation apparatus PV, a variety of loads 50 and 60, other electrical storage systems, etc. Each device in the external device 200 is connected to the wiring drawn from the direct-current wiring between the bidirectional AC/DC converter 20 and the DC/DC converter 10.

The short-circuit protection apparatus 40 is provided in series on the direct-current wiring which connects the external device 200 to the direct-current wiring between the bidirectional AC/DC converter 20 and the DC/DC converter 10. In this embodiment, the short-circuit protection apparatus 40 performs a protecting operation when a short circuit occurs on the side of the external device 200.

FIG. 2 generally illustrates one example of the structure of the short-circuit protection apparatus 40. The short-circuit protection apparatus 40 comprises an electrical storage unit 110 which outputs direct-current power, a semiconductor switch element SW which blocks positive-side wiring connecting the electrical storage unit 110 to the external device 200, a diode 42 which is connected in parallel with the semiconductor switch element SW in the direction of a current flowing from the external device 200 to the electrical storage unit 110, a voltage detection unit 44 which detects voltages at both ends of the semiconductor switch element SW, a temperature detection unit 46, a switch control unit CTR which opens the semiconductor switch element SW when the voltage detected by the voltage detection unit 44 is a predetermined value or greater, and a cooling unit 48. Additionally, the electrical storage unit 110 includes at least a pair of the battery module BT and the DC/DC converter 10.

The semiconductor switch element SW is a normally-on type junction field-effect transistor which includes, for example, a silicon carbide (SIC) semiconductor layer. A source electrode S of the semiconductor switch element SW is electrically connected to a positive terminal on the side of the external device 200. A drain electrode D of the semiconductor switch element SW is electrically connected to a positive terminal on the side of the DC/DC converter 10. The potential of a gate electrode G of the semiconductor switch element SW is controlled by the switch control unit CTR, which described later.

The diode 42 is connected in parallel with the semiconductor switch element SW. The diode 42 is connected in the forward direction from the source electrode S to the drain electrode D of the semiconductor switch element SW, which is the direction of a forward current flowing from the side of the external device 200 to the side of the DC/DC converter 10. The diode 42 prevents exertion of a voltage beyond the reverse tolerance of the semiconductor switch element SW, when an overcurrent flows from the external device 200 toward the DC/DC converter 10.

The voltage detection unit 44 detects the voltage between the source electrode S and the drain electrode D of the semiconductor switch element SW, for a periodical output to the switch control unit CTR.

The temperature detection unit 46 is connected to a temperature sensor SS disposed near the semiconductor switch element SW and detects the temperature of the semiconductor switch element SW using the temperature sensor SS, for a periodical output to the switch control unit CTR.

The cooling unit 48 comprises a cooling fan, a heat sink, etc. for cooling the semiconductor switch element SW. The cooling unit 48 starts or stops cooling the semiconductor switch element SW in accordance with a control signal from the switch control unit CTR.

The switch control unit CTR controls the potential of the gate electrode of the semiconductor switch element SW in accordance with the voltage value received from the voltage detection unit 44. The switch control unit CTR opens the semiconductor switch element SW when the voltage between the source electrode S and the drain electrode D of the semiconductor switch element SW is a short-circuit detection voltage or greater.

Also, the switch control unit CTR controls the cooling unit 48 in accordance with the temperature value received from the temperature detection unit 46. The switch control unit CTR causes the cooling unit 48 to start cooling when the temperature of the semiconductor switch element SW is a predetermined value or greater.

Figure 3:
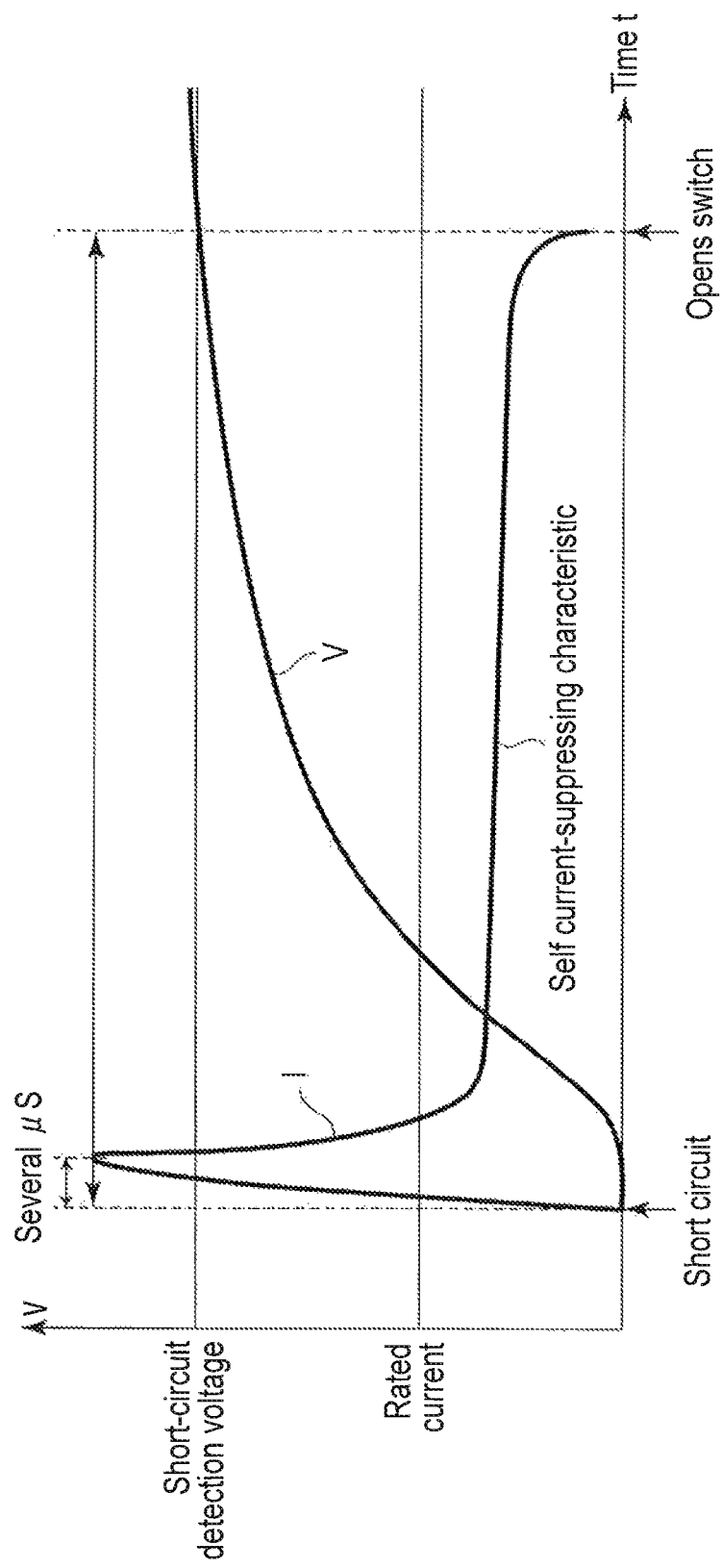
FIG. 3 is intended for explanation of one example of the operation of a short-circuit protection apparatus in an electrical storage apparatus according to the first embodiment.

FIG. 3 shows one example of the temporal changes of voltage V and current I at the occurrence of a short circuit, where V is the voltage between the source electrode S and the drain electrode D of the semiconductor switch element SW and I is the current flowing into the semiconductor switch element SW. It is noted that FIG. 3 shows the voltage V and the current I in the case where a normally-on type junction field-effect transistor including a silicon carbide (SiC) semiconductor layer is employed as the semiconductor switch element SW.

First, when an external short-circuit occurs, a short-circuit current flows into the semiconductor switch element SW and the current I becomes a rated current or greater. After a lapse of several microseconds, the temperature of the semiconductor switch element rises to increase the on resistance, the current flowing into the semiconductor switch element SW is suppressed, and thereby the current I drops below the rated current. This current-suppressing function is due to the nature that silicon (Si) is superior in high temperature operating characteristics to silicon carbide (SiC), which accordingly leads to suppression of a current before destruction of the element.

In a self current-suppressing area, only the current I which is equal to or below the rated current of the semiconductor switch element SW flows. This area is not capable for determination of whether a short circuit is present or not, even from measurement of the current I.

A current equal to or greater than the rated current flows at the moment of a short circuit. Thus, detecting this current would allow determination of whether a short circuit is present or not. However, with the semiconductor switch element SW including a silicon carbide (SIC) semiconductor layer, the current I is suppressed after a lapse of several microseconds. This will require detection in an extremely short time, making it difficult to provide a noise withholding design to prevent malfunctions in order for implementation in a practical circuit.

Therefore, in the electrical storage apparatus according to this embodiment, the presence of a short circuit is determined through the detection of the voltage V of the semiconductor switch element SW. The voltage V of the semiconductor switch element SW gradually increases according to the time constant of a circuit and reaches the short-circuit detection voltage after 1 millisecond to 10 milliseconds of the occurrence of a short circuit. For this reason, secure short-circuit protection without malfunctions can be achieved by detecting the voltage V to determine whether a short circuit is present or not and by controlling the gate potential of the semiconductor switch element SW.

Additionally, since the temperature of the semiconductor switch element SW rises at the occurrence of a short circuit as described above, the short-circuit protection apparatus 40 needs to include a cooling apparatus. The switch control unit CTR receives temperature information from the temperature detection unit 46 and activates a cooling fan, heat sink, etc. When the temperature of the semiconductor switch element SW is high, the switch control unit CTR may enhance the cooling ability by operating the cooling fan.

In the above manner, the short-circuit protection apparatus 40 can securely block the circuit while protecting the circuit from an external short circuit.

Therefore, according to this embodiment, the circuit can securely be protected at the occurrence of an external short circuit even when the electrical storage apparatus 100 and the external device 200 are connected by direct-current wiring. As a result, the electrical storage apparatus with a high efficiency in use of stored power can be provided.

Next, the electrical storage apparatus according to the second embodiment will be described in detail with reference to the drawings. In the following, the same structures as in the above first embodiment will be represented by the same reference symbols, and their descriptions will be omitted.

FIG. 4 generally illustrates one example of the structure of the short-circuit protection apparatus 40 in the electrical storage apparatus 100 according to this embodiment.

The short-circuit protection apparatus 40 comprises semiconductor switch elements SWA and SWB connected in series to the positive-side wiring between an electrical storage unit 110 and an external device 200, diodes 42A and 42B, voltage detection units 44A and 445, and switch control units CTRA and CTRB.

The semiconductor switch elements SWA and SWB are normally-on type junction field-effect transistors which include, for example, silicon carbide (SiC) as a semiconductor layer.

A source electrode of the semiconductor switch element SWA is connected to a drain electrode of the semiconductor switch element SWB. A drain electrode of the semiconductor switch element SWA is electrically connected to a positive terminal on the side of a DC/DC converter 10. The potential of a gate electrode of the semiconductor switch element SWA is controlled by the switch control unit CTRA.

A drain electrode of the semiconductor switch element SWB is electrically connected to a positive terminal on the side of an external device 200. The potential of a gate electrode of the semiconductor switch element SWB is controlled by the switch control unit CTRB.

The diode 42A is connected in parallel with the semiconductor switch element SWA. The diode 42A is connected in the forward direction from the source electrode to the drain electrode of the semiconductor switch element SWA, which is the direction of a forward current flowing from the side of the external device 200 to the side of the DC/DC converter 10. The d-iode 42A prevents exertion of a voltage beyond the reverse tolerance of the semiconductor switch element SWA, when an overcurrent flows from the external device 200 toward the DC/DC converter 10.

The diode 42B is connected in parallel with the semiconductor switch element SWB. The diode 42B is connected in the forward direction from the source electrode to the drain electrode of the semiconductor switch element SWB, which is the direction of a forward current flowing from the side of the DC/DC converter 10 to the side of the external device 200. The diode 42B prevents exertion of a voltage beyond the reverse tolerance of the semiconductor switch element SWB, when an overcurrent flows from the DC/DC converter 10 toward the external device 200.

The voltage detection unit 44A detects the voltage between the source electrode and the drain electrode of the semiconductor switch element SWA, for a periodical output to the switch control unit CTRA. The voltage detection unit 44B detects the voltage between the source electrode and the drain electrode of the semiconductor switch element SWB, for a periodical output to the switch control unit CTRB.

The switch control unit CTRA controls the potential of the gate electrode of the semiconductor switch element SWA in accordance with the voltage value received from the voltage detection unit 44A. The switch control unit CTRA opens the semiconductor switch element SWA when the voltage between the source electrode and the drain electrode of the semiconductor switch element SWA is a short-circuit detection voltage or greater.

The switch control unit CTRB controls the potential of the gate electrode of the semiconductor switch element SWB in accordance with the voltage value received from the voltage detection unit 44B. The switch control unit CTRB opens the semiconductor switch element SWB when the voltage between the source electrode and the drain electrode of the semiconductor switch element SWB is a short-circuit detection voltage or greater.

In general, a junction field-effect transistor containing silicon carbide (SIC) does not have reverse tolerance. Accordingly, when short-circuit energy flows into an electrical storage apparatus from an external device, such as at the occurrence of a short circuit inside the electrical storage apparatus according to the above-described first embodiment, it is necessary to cause a current to flow with the use of diodes in anti-parallel connection. On the other hand, in the electrical storage apparatus according to this embodiment, the short-circuit protection apparatus 40 comprises the semiconductor switch elements SWA and SWB which are connected to one another in reverse directions, allowing bidirectional short-circuit protection to be performed.

In other words, the electrical storage apparatus 100 according to this embodiment can securely block the circuit while protecting the circuit from an external short circuit as well as an internal short circuit.

Therefore, according to this embodiment, the circuit can securely be protected at the occurrence of a short circuit even when the electrical storage apparatus 100 and the external device 200 are connected by direct-current wiring. As a result, the electrical storage apparatus with a high efficiency in use of stored power can be provided.

Next, the electrical storage apparatus according to the third embodiment will be described in detail with reference to the drawings.

FIG. 5 generally illustrates one example of the structure of the short-circuit protection apparatus 40 in the electrical storage apparatus 100 according to this embodiment.

The short-circuit protection apparatus 40 in the electrical storage apparatus 100 according to this embodiment also comprises semiconductor switch elements connected in series on the negative-side wiring between an electrical storage unit 110 and an external device 200, in addition to the structures as described above for the short-circuit protection apparatus 40 according to the second embodiment.

According to this embodiment, the short-circuit protection apparatus 40 comprises the semiconductor switch elements SWC and SWD connected in series to the negative-side wiring between the electrical storage unit 110 and the external device 200, diodes 42C and 42D, voltage detection units 44C and 44D, and switch control units CTRC and CTRD. The semiconductor switch elements SWC and SWD are normally-on type junction field-effect transistors which include, for example, silicon carbide (SiC) as a semiconductor layer.

A source electrode of the semiconductor switch element SWC is connected to a drain electrode of the semiconductor switch element SWD. A drain electrode of the semiconductor switch element SWC is electrically connected to a positive terminal on the side of a DC/DC converter 10. The potential of a gate electrode of the semiconductor switch element SWC is controlled by the switch control unit CTRC.

A drain electrode of the semiconductor switch element SWD is electrically connected to a positive terminal on the side of the external device 200. The potential of a gate electrode of the semiconductor switch element SWD is controlled by the switch control unit CTRD.

The diode 42C is connected in parallel with the semiconductor switch element SWC. The diode 42C is connected in the forward direction from the source electrode to the drain electrode of the semiconductor switch element SWC, which is the direction of a forward current flowing from the side of the external device 200 to the side of the DC/DC converter 10. The diode 42C prevents exertion of a voltage beyond the reverse tolerance of the semiconductor switch element SWC, when an overcurrent flows from the external device 200 toward the DC/DC converter 10.

The diode 42D is connected in parallel with the semiconductor switch element SWD. The diode 42D is connected in the forward direction from the source electrode to the drain electrode of the semiconductor switch element SWD, which is the direction of a forward current flowing from the side of the DC/DC converter 10 to the side of the external device 200. The diode 42D prevents exertion of a voltage beyond the reverse tolerance of the semiconductor switch element SWD, when an overcurrent flows from the DC/DC converter 10 toward the external device 200.

The voltage detection unit 44C detects the voltage between the source electrode and the drain electrode of the semiconductor switch element SWC, for a periodical output to the switch control unit CTRC. The voltage detection unit 44D detects the voltage between the source electrode and the drain electrode of the semiconductor switch element SWD, for a periodical output to the switch control unit CTRD.

The switch control unit CTRC controls the potential of the gate electrode of the semiconductor switch element SWC in accordance with the voltage value received from the voltage detection unit 44C. The switch control unit CTRC opens the semiconductor switch element SWC when the voltage between the source electrode and the drain electrode of the semiconductor switch element SWC is a short-circuit detection voltage or greater.

The switch control unit CTRD controls the potential of the gate electrode of the semiconductor switch element SWD in accordance with the voltage value received from the voltage detection unit 44D. The switch control unit CTRD opens the semiconductor switch element SWD when the voltage between the source electrode and the drain electrode of the semiconductor switch element SWD is a short-circuit detection voltage or greater.

The remaining structures of the electrical storage apparatus according to this embodiment are the same as the structures of the electrical storage apparatus 100 according to the second embodiment.

In other words, the electrical storage apparatus 100 according to this embodiment can securely block the circuit while protecting the circuit from an external short circuit as well as an internal short circuit Furthermore, this embodiment not only realizes the bidirectional short-circuit protection on the side of the external, device 200 and inside the electrical storage apparatus 100 as described above for the electrical storage apparatus 100 according to the second embodiment, but also allows the circuit to be pro-ected from a ground fault.

Therefore, according to this embodiment, the circuit can securely be protected at the occurrence of a short circuit even when the electrical storage apparatus 100 and the external device 200 are connected by direct-current wiring. As a result, the electrical storage apparatus with a high efficiency in use of stored power can be provided.

It is noted that, in the second and third embodiments, the short-circuit protection apparatus 40 may also comprise a temperature detection unit and a cooling unit. With the temperature unit and the cooling unit, heat generation at the occurrence of a short circuit can be suppressed.

Additionally, although the above embodiments employ a normally-on type switch element as the semiconductor switch element, a normally-off type semiconductor switch element may instead be employed. Further, although the short-circuit protection apparatuses 40 according to the above embodiments comprise the semiconductor switch element including a silicon carbide (SiC) semiconductor layer, the switch element is not limited to this form but may be any form as far as a current flowing into the element is suppressed before destruction of the element at the time of heat generation.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electrical storage apparatus comprising:
    an electrical storage unit configured to output direct-current power;
    a switch element configured to block positive-side wiring connecting the electrical storage unit to an outside;
    a diode connected in parallel with the switch element in a direction of a current flowing from the outside to the electrical storage unit;
    a voltage detection unit configured to detect voltages at both ends of the switch element; and
    a switch control unit configured to open the switch element when the voltage detected by the voltage detection unit is a predetermined value or greater.

2. The electrical storage apparatus of claim 1, wherein the switch element is a normally-off type junction field-effect transistor which includes a silicon carbide semiconductor layer.

3. The electrical storage apparatus of claim 2, further comprising:
    a second switch element on the positive-side wiring, the second switch element connected in reverse to the switch element and configured to block the positive-side wiring;
    a second diode connected in parallel with the second switch element in a direction of a current flowing from the electrical storage unit to the outside;
    a second voltage detection unit configured to detect voltages at both ends of the second switch element; and
    a second switch control unit configured to open the second switch element when the voltage detected by the second voltage detection unit is a predetermined value or greater.

4. The electrical storage apparatus of claim 2, further comprising:
    a third switch element and a fourth switch element on a negative-side wiring between the electrical storage unit and the outside, the third switch element and the fourth switch element connected in reverse to each other and configured to block the negative-side wiring;
    a third diode connected in parallel with the third switch element in a direction of a current flowing from the outside to the electrical storage unit;
    a third voltage detection unit configured to detect voltages at both ends of the third switch element;
    a third switch control unit configured to open the third switch element when the voltage detected by the third voltage detection unit is a predetermined value or greater;
    a fourth diode connected in parallel with the fourth switch element in a direction of a current flowing from the outside to the electrical storage unit;

a fourth voltage detection unit configured to detect voltages at both ends of the fourth switch element; and a fourth switch control unit configured to open the fourth switch element when the voltage detected by the fourth voltage detection unit is a predetermined value or greater.

5. The electrical storage apparatus of claim 1, further comprising:

a temperature detection unit configured to detect a temperature in a vicinity of the switch element; and a cooling unit configured to cool the switch element, wherein the switch control unit is configured to control the cooling unit based on temperature information from the temperature detection unit.

6. The electrical storage apparatus of claim 5, further comprising:

a third switch element and a fourth switch element on a negative-side wiring between the electrical storage unit and the outside, the third switch element and the fourth switch element connected in reverse to each other and configured to block the negative-side wiring;

a third diode connected in parallel with the third switch element in a direction of a current flowing from the outside to the electrical storage unit;

a third voltage detection unit configured to detect voltages at both ends of the third switch element;

a third switch control unit configured to open the third switch element when the voltage detected by the third voltage detection unit is a predetermined value or greater;

a fourth diode connected in parallel with the fourth switch element in a direction of a current flowing from the outside to the electrical storage a fourth voltage detection unit configured to detect voltages at both ends of the fourth switch element; and a fourth switch control unit configured to open the fourth switch element when the voltage detected by the fourth voltage detection unit is a predetermined value or greater.

7. The electrical storage apparatus of claim 1, further comprising:

a second switch element on the positive-side wiring, the second switch element connected in reverse to the switch element and configured to block the positive-side wiring;

a second diode connected in parallel, with the second switch element in a direction of a current flowing from the electrical storage unit to the outside;

a second voltage detection unit configured to detect voltages at both ends of the second switch element; and a second switch control unit configured to open the second switch element when the voltage detected by the second voltage detection unit is a predetermined value or greater.

8. The electrical storage apparatus of claim 1, further comprising:

a third switch element and a fourth switch element on a negative-side wiring between the electrical storage unit and the outside, the third switch element and the fourth switch element connected in reverse to each other and configured to block the negative-side wiring;

a third diode connected in parallel with the third switch element in a direction of a current flowing from the outside to the electrical storage unit;

a third voltage detection unit configured to detect voltages at both ends of the third switch element;

a third switch control unit configured to open the third switch element when the voltage detected by the third voltage detection unit is a predetermined value or greater;

a fourth diode connected in parallel with the fourth switch element in a direction of a current flowing from the outside to the electrical storage unit;

a fourth voltage detection unit configured to detect voltages at both ends of the fourth switch element; and a fourth switch control unit configured to open the fourth switch element when the voltage detected by the fourth voltage detection unit is a predetermined value or greater.

\* \* \* \* \*